(12) United States Patent
Weng

(10) Patent No.: US 11,870,970 B2
(45) Date of Patent: Jan. 9, 2024

(54) VR DISPLAY SYSTEM BASED ON MOBILE TERMINAL

(71) Applicant: PIMAX TECHNOLOGY (SHANGHAI) CO., LTD, Shanghai (CN)

(72) Inventor: Zhibin Weng, Shanghai (CN)

(73) Assignee: PIMAX TECHNOLOGY (SHANGHAI) CO., LTD, Shanghai (CN)

( * ) Notice: Subject to any disclaimer, the term of this patent is extended or adjusted under 35 U.S.C. 154(b) by 0 days.

(21) Appl. No.: 16/965,024

(22) PCT Filed: Jan. 29, 2019

(86) PCT No.: PCT/CN2019/073691
§ 371 (c)(1),
(2) Date: Jul. 27, 2020

(87) PCT Pub. No.: WO2019/149191
PCT Pub. Date: Aug. 8, 2019

(65) Prior Publication Data
US 2021/0112239 A1    Apr. 15, 2021

(30) Foreign Application Priority Data

Jan. 30, 2018 (CN) .......................... 201810089850.1

(51) Int. Cl.
*H04N 13/344*      (2018.01)
*H04N 19/597*      (2014.01)
(Continued)

(52) U.S. Cl.
CPC .... *H04N 13/344* (2018.05); *H04M 1/724097* (2022.02); *H04N 13/305* (2018.05); *H04N 19/597* (2014.11)

(58) Field of Classification Search
CPC ... H04N 13/344; H04N 13/305; H04N 19/597
See application file for complete search history.

(56) References Cited

U.S. PATENT DOCUMENTS

2018/0088886 A1* 3/2018 Virodov ................. G06F 1/163
2018/0308288 A1* 10/2018 Harscoet ............... G06T 19/006
(Continued)

FOREIGN PATENT DOCUMENTS

CN       105847578 A      8/2016
CN       106020480 A     10/2016
(Continued)

OTHER PUBLICATIONS

International Search Report issued in corresponding PCT Application No. PCT/CN2019/073691, dated Apr. 10, 2019.
(Continued)

*Primary Examiner* — Tat C Chio
(74) *Attorney, Agent, or Firm* — Westbridge IP LLC

(57) ABSTRACT

Disclosed are an eye lens, glasses, a head-mounted display, and a VR system. The eye lens comprises: a first lens portion and a second lens portion, the first lens portion is connected to the second lens portion, and the field angle of the first lens portion and the field angle of the second lens portion form an overall field angle of the eye lens. The present invention solves the technical problem of a large number of lenses and narrow field angles caused by coaxial arrangement of multiple lenses.

16 Claims, 4 Drawing Sheets

(51) Int. Cl.
    *H04N 13/305*     (2018.01)
    *H04M 1/72409*     (2021.01)

(56) References Cited

U.S. PATENT DOCUMENTS

2019/0026871 A1*   1/2019   Han .................. G02B 27/0176
2020/0145696 A1*   5/2020   Fitzgerald ............ H04N 19/146
2020/0174260 A1*   6/2020   Min ....................... A45C 13/02

FOREIGN PATENT DOCUMENTS

| | | |
|---|---|---|
| CN | 106131538 A | 11/2016 |
| CN | 106534783 A | 3/2017 |
| CN | 206115027 U | 4/2017 |
| CN | 107071136 A | 8/2017 |
| CN | 107589544 A | 1/2018 |
| CN | 108174175 A | 6/2018 |
| CN | 109144176 A | 1/2019 |
| KR | 20170029144 A | 3/2017 |
| KR | 1791917 B1 * 11/2017 ........... G06T 19/006 |
| WO | 2017200182 A1 | 11/2017 |

OTHER PUBLICATIONS

Written Opinion issued in corresponding PCT Application No. PCT/CN2019/073691, dated Apr. 10, 2019.

\* cited by examiner

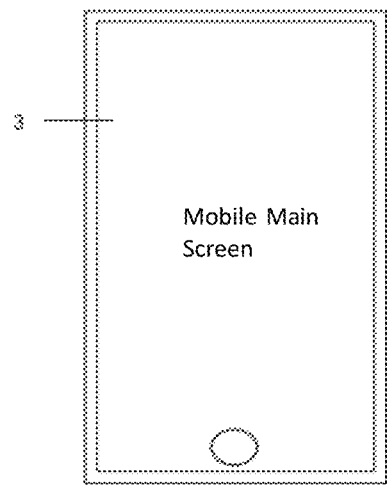
Figure 3a
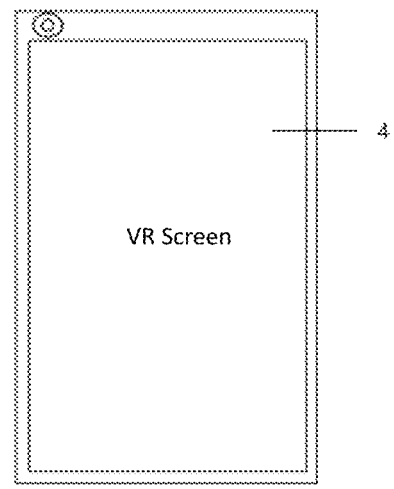
Figure 3b
Figure 3
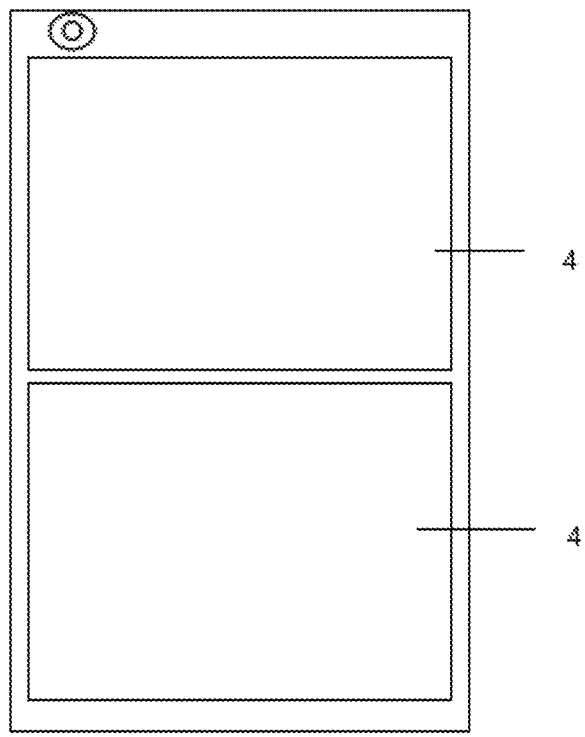
Figure 4

VR DISPLAY SYSTEM BASED ON MOBILE TERMINAL

Application No. 201810089850.1, named "Mobile Terminal-based VR Display System", was filed with the National Intellectual Property Administration on Jan. 30, 2018. All the disclosed contents of the priority of this Chinese invention patent are referenced herein.

TECHNICAL FIELD

This application relates to the technical field of virtual reality equipment, specifically, a mobile terminal-based VR display system.

BACKGROUND ART

Virtual reality (or VR) is a computer simulation system that can create and allow users to experience the virtual world. It utilizes a computer to generate a simulated environment which is an interactive 3D dynamic view with integration of information from multiple sources and a systematic simulation of substantive behaviors and thus can immerse the user in this environment.

The technical field of VR primarily faces three major technical problems: screen refresh rate, resolution and field angle. Relevant VR equipment, e.g. VR head-mounted display, is based on PC (computer) technology because only a PC-based VR device can address the foregoing problems. However, a cellphone and other mobile terminal-based VR is different. Although the problem of screen refresh rate of a cellphone and other mobile terminals can be addressed through screen customization, the problem of low resolution cannot be settled. The main defect is a full screen of mosaics. Meanwhile, the field angle is limited to 80-90 degrees so that the user feels he is standing outside the window seeing the sights and has very poor experiences due to dizziness, screen door effects and low field angle.

The information disclosed in the background art of this application only aims to deepen the understanding of the general background art of this application and shall not be deemed as the recognition or any form of implicit indication that the information has become a prior technology known to all technicians in the art.

SCOPE OF INVENTION

The main purpose of this invention is to provide a type of goggles, glasses, head-mounted display and VR system to address the problems of screen refresh rate and resolution of a mobile terminal in the prior art.

To address the foregoing problems, this application discloses one mobile terminal-based VR display system on the one hand. This system comprises a mobile terminal and a VR head-mounted device. Said mobile terminal is mounted in the slot at the front end of said VR head-mounted device.

Said mobile terminal comprises a processing unit, a video processing unit, a main screen unit and a VR screen unit, wherein said processing unit is configured to control the exported video signals of said main screen unit and/or use said video processing unit to compress the VR contents and export them to said VR screen unit.

Said VR head-mounted device is configured to receive the contents exported by said VR screen unit.

Further, said VR screen unit comprises two VR screens.

Further, said VR head-mounted device is a VR box containing a VR sub-screen.

Further, said VR box is installed with a first optical lens and a second optical lens; said first optical lens and second optical lens create an acute angle.

Further, the angle between the first optical lens and the second optical lens is 15 degrees.

Further, the angle between said first optical lens and the VR screen unit of said mobile terminal is 0-5 degrees.

Further, the angle between said second optical lens and VR sub-screen is 0-5 degrees.

Additionally, the application further discloses one mobile terminal-based VR display system. The system comprises a mobile terminal and a VR head-mounted device.

The mobile terminal is connected onto the VR head-mounted device in a removable manner and comprises one processing unit, one main screen unit and one VR screen unit. Relative to the main screen unit, the VR screen unit is close to the user operation side of the VR head-mounted device. Both the main screen unit and the VR screen unit have communication links with the processing unit. The processing unit is configured to control the main screen unit to export video signals to the VR screen unit so that the VR screen unit can play the video signals.

Optionally, the mobile terminal further comprises the video signal interface for communication with the VR head-mounted device; the video signal interface has communication links with the main screen unit; the processing unit is configured to export the video signals to VR head-mounted device via the video signal interface so that the VR head-mounted device can play the video signals.

Optionally, the mobile terminal further comprises a video processing unit.

The processing unit, VR screen unit and video signal interface all have communication links with the video processing unit.

The video processing unit is configured to compress the video signals to create compressed video data and transmit the compressed video data to the VR screen unit and the VR head-mounted device so that the VR screen unit and the VR head-mounted device can analyze the compressed video data and acquire video signals.

Optionally, the VR head-mounted device comprises a VR sub-screen; the VR sub-screen has communication links with the video signal interface; the VR sub-screen is configured to play the video signals.

Optionally, the VR head-mounted device further comprises the first optical lens and the second optical lens; said first optical lens is positioned between the VR screen unit and the user operation side of the VR head-mounted device; said second optical lens is positioned between the VR sub-screen unit and the user operation side of the VR head-mounted device; and the first optical lens and second optical lens constitute an obtuse angle.

Optionally, the angle between the first optical lens and the second optical lens is 130-160 degrees.

Optionally, the angle between the first optical lens and the VR screen unit is 0-5 degrees.

Optionally, the angle between the second optical lens and the VR sub-screen is 0-5 degrees.

Optionally, the VR screen unit comprises at least one VR screen.

Optionally, the VR head-mounted device has a slot to accommodate the mobile terminal.

This application has the following positive benefits: this application uses the interactions between the VR screen unit and the VR head-mounted device mounted on the mobile terminal to enhance the VR display resolution and the field angle and thus apply VR technologies to the mobile terminal.

DESCRIPTIONS OF ATTACHED DRAWINGS

As part of the application, the attached drawings work to deepen the understanding of this application so that other characteristics, purposes and strong suits of this application become more evident. The schematic diagrams of the application's embodiments and their descriptions are used to explain this application but shall not constitute improper restrictions on this application. In the attached drawings.

Figure 5:
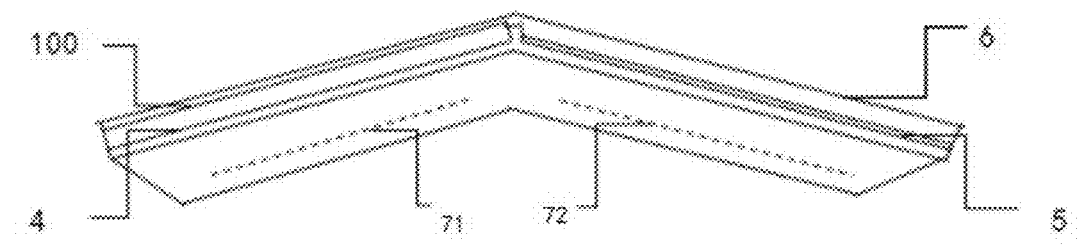
Figure 6:
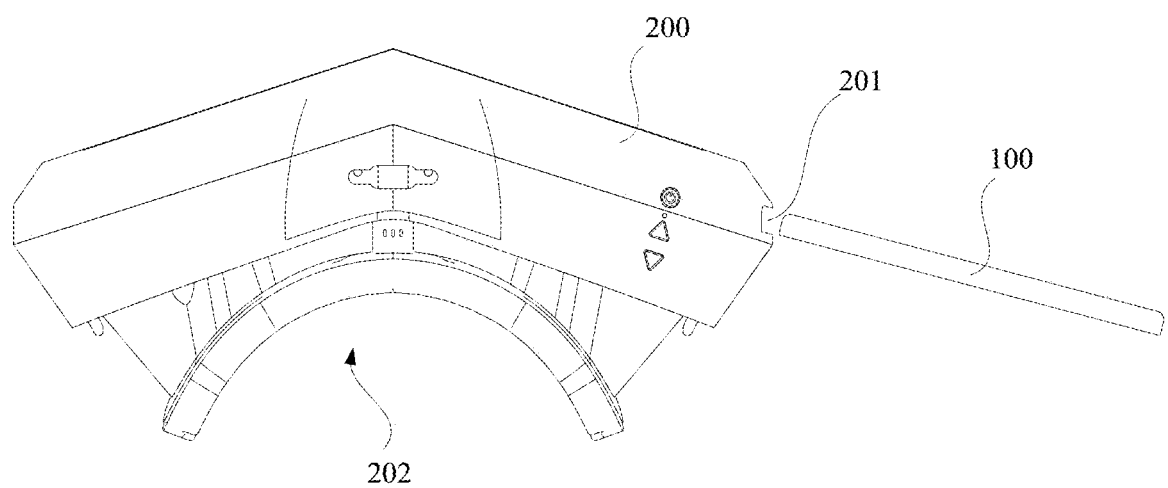
Figure 7:
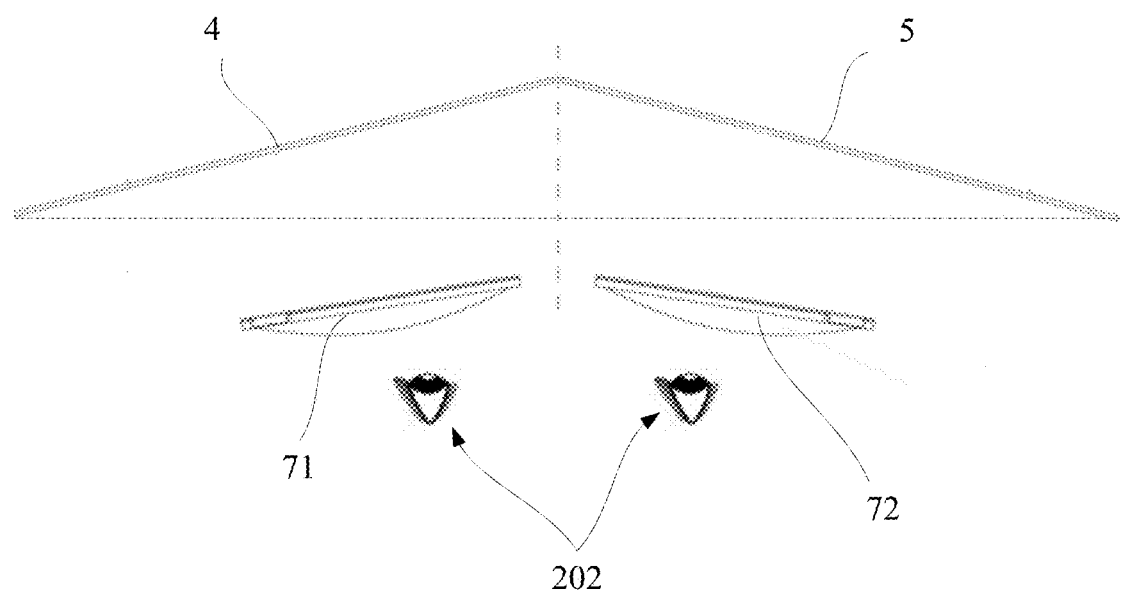

FIG. 3*a* is the structural diagram of the front side of one embodiment of said mobile terminal disclosed by this invention;

FIG. 3*b* is the structural diagram of the back side of one embodiment of said mobile terminal disclosed by this invention;

FIG. 4 is the structural diagram of the back side of another embodiment of said mobile terminal disclosed by this invention;

FIG. 5 is the structural diagram of another embodiment of said mobile terminal-based VR display system disclosed by this invention;

FIG. 6 is a schematic structural diagram of a mobile terminal-based VR display system by an embodiment of the present application; and FIG. 7 is a schematic structural diagram of a mobile terminal-based VR display system by another embodiment of the present application.

SPECIFIC EMBODIMENTS

To make those in the art better understand the solution disclosed by this application, a clear and complete description of the technical solution of embodiments of this application will be provided below with reference to the attached drawings. Apparently, said embodiments are just part of the embodiments of this application. Based on the embodiments specified herein, all other embodiments acquired by those with ordinary skills in the art without creative labors shall also be within the scope of protection of this application.

It is noteworthy that "first" and "second," as specified in the specifications, the claims and the foregoing attached drawings are used to differentiate similar objects but shall not denote any specific sequence or order. It shall be understood that the data used in this manner are interchangeable under certain circumstances for the convenience of the embodiments introduced herein. Moreover, "include" and "has" and any of their modifications shall not be exclusive of others.

Moreover, "install", "configure", "fix", "connect", "removable" and "locked" shall be understood in a broad sense. For instance, "connect" may be fixed connection, removable connection or integrated formation; it may be mechanical connection or electric connection; it may be direct connection or connection via a medium or the interconnection between two devices, elements or constituents. Those with ordinary skills in the art can understand the meaning of these terms in this application as the case may be.

It is noteworthy that the embodiments and the characteristics therein can be combined with one another in the case of no conflict. The application will be introduced below with reference to the attached drawings and the embodiments.

Embodiment 1

Figure 1:
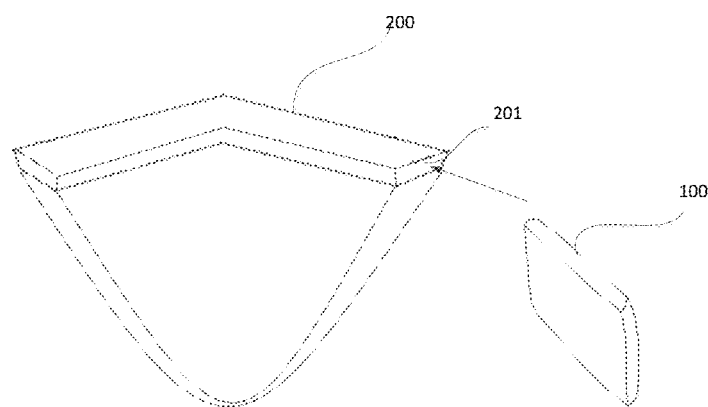
FIG. 1 is the structural diagram of said mobile terminal-based VR display system disclosed by this invention.
Figure 2:
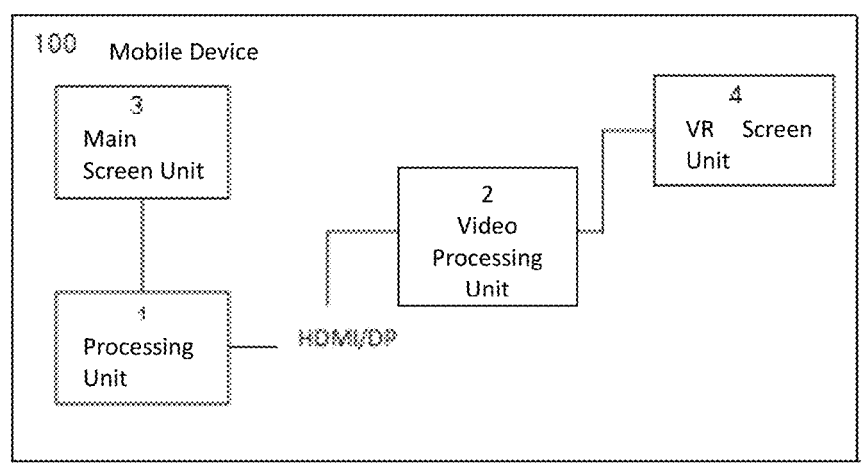
FIG. 2 is the block diagram of the structure of one embodiment of said mobile terminal disclosed by this invention.

As FIG. 1-2 shows, this invention discloses one mobile terminal-based VR display system. This system comprises mobile terminal 100 and VR head-mounted device 200. Said mobile terminal is mounted in slot 201 at the front end of said VR head-mounted device.

Said mobile terminal comprises processing unit 1, video processing unit 2, main screen unit 3 and VR screen unit 4, wherein said processing unit 1 is configured to control the exported video signals of said main screen unit 3 and/or use said video processing unit 2 to compress the VR contents and export them to said VR screen unit 4; said VR head-mounted device 200 is configured to receive the contents exported by said VR screen unit 4.

In operation, the user places mobile terminal 100 into card slot 201 at the front end of VR head-mounted device 200 and puts on the VR head-mounted device. The processing unit in said mobile terminal controls the video processing unit to compress the VR contents and export them to the VR screen unit. The user directly views the contents projected on the mobile terminal's VR screen unit via the VR head-mounted device.

Specifically, said mobile terminal includes cellphone, pad, etc. FIGS. 3*a* and 3*b* show the structural diagram of one embodiment of the said mobile terminal disclosed by this invention. In this embodiment, said mobile terminal is a cell phone and said main screen unit (hereinafter referred to as "main screen") and said VR screen unit (hereinafter referred to as "VR screen") are installed on the front and back sides of said mobile terminal and constitute a mode of front and back screens of the mobile terminal. The problem of VR experience is thus settled through separation of the main screen and the VR screen. The main screen is the screen for routine use. The VR screen is normally not on and will be turned on only when VR experience is underway. Moreover, the VR screen has a high resolution to realize the VR support at a mobile terminal (e.g. cellphone; a cellphone is used as the example for explanation below) and save power consumption of the cellphone. As FIG. 3*b* shows, the VR screen unit of this embodiment comprises one VR screen. In some other embodiments, as FIG. 4 shows, said VR screen unit comprises two VR screens.

In some embodiments, as FIG. 5 shows, said VR head-mounted device is VR box 6 containing VR sub-screen 5 inside. The VR sub-screen of the VR head-mounted device of this embodiment and the VR screen of the cellphone constitute the twin-screen display mode together. Insert the cellphone into the VR box; the VR box connects the VR sub-screen into the cellphone via HDMI or DP interface to constitute the twin-screen display mode, realizing the purpose of watching the VR content with both eyes and thus reducing the cost of VR device. Specifically, the cellphone CPU (i.e. central processing unit) is the central processing system of the whole cellphone and the main screen (i.e. main screen unit) exports the video signals via the standard cellphone screen interface. The video processing unit compresses the VR content and exports it to the VR screen and the said VR sub-screen via HDMI or DP high-resolution video signal interface.

FIG. 5 is the structural diagram of another embodiment of the mobile terminal-based VR display system. In this embodiment, said VR box 6 is mounted with first optical lens 71 and second optical lens 72. Said first optical lens 71 and said second optical lens 72 constitute an acute angle. Specifically, the angle between said first optical lens and said second optical lens may be set as 15 degrees. In this embodiment, the angle between said first optical lens and the VR screen unit of said mobile terminal is 0-5 degrees and the angle between said second optical lens and VR sub-screen is 0-5 degrees. In practice, the content displayed on said mobile terminal's VR screen is exported to said VR sub-screen; said first optical lens and said second optical lens work on both eyes; the angle between said first optical lens and said second optical lens guarantees that said first optical lens refracts the content displayed on the VR screen onto said VR sub-screen via said second optical lens to realize the double-eye display of the VR content and reduce the costs of the double-eye VR technology.

The optical lenses configuration of this embodiment expands the field angle of VR screen unit in the cellphone, addresses the problems of dizziness and screen door effects of VR experience at a mobile terminal and enhances user experiences.

In the foregoing embodiment, VR screen can work independently or together with the VR sub-screen in the VR box. It can achieve a field angle of over 110 degrees if it works independently. Specifically, said VR screen can be selected according to the highest screen resolution available in the market; the field angle can exceed 200 degrees when the VR screen and VR sub-screen work together, wherein said VR sub-screen can have double the highest resolution available in the market.

In the foregoing embodiment, VR screen may comprise one single screen or double screens whether it works independently or together with VR sub-screen. In the cellphone of FIG. 4, VR screen comprises two VR screens. The problem of selfie-taking can be addressed by addition of VR screen. With the increasing size of cellphone screens, there is virtually no space to accommodate a camera on the main screen, or the front camera can't compare with the back camera in resolution. The additional VR screen of this invention may also be used for photographing and video production. One back camera may be added. The main screen works during normal photographing and the VR screen works for a selfie.

Embodiment 2

This application discloses another type of mobile terminal-based VR display system, as FIGS. 1, 2 and 6 show. This system comprises mobile terminal 100 and VR head-mounted device 200; mobile terminal 100 is connected to VR head-mounted device 200 in a removable manner; mobile terminal 100 comprises processing unit 1, main screen unit 3 and VR screen unit 4; relative to main screen unit 3, VR screen unit 4 is close to the user operation side 202 of VR head-mounted device 200; both main screen unit 3 and VR screen unit 4 have communication links with processing unit 1; processing unit 1 is configured to control main screen unit 3 to export video signals to VR screen unit 4 so that VR screen unit 4 plays the video signals.

Specifically, the user wears VR head-mounted device 200 on his head so that the user can see VR screen unit 4 during his use of the VR display system based on mobile terminal 100. Through connection of the user's cellphone and other mobile terminal 100 to VR head-mounted device 200 in a removable manner, processing unit 1 responds to user operations; through export of video signals to VR screen unit 4 via main screen unit 3, the user can view the contents corresponding to the video signals played on VR screen unit 4. The adoption of VR screen unit 4 can thus address the problem of low screen refresh rate and resolution of mobile terminal 100. Main screen unit 3 is configured for routine use and has a low power consumption. It can satisfy the user's endurance requirement on cellphone and other mobile terminal 100, reduce the calorific value of cellphone and other mobile terminal 100 and increase the user's level of comfort; VR screen unit 4 is not normally on, and will be turned on only for the purpose of VR experience. Moreover, VR screen has a higher resolution and thus can realize the VR support of mobile terminal 100. It can well address the problem of graininess and save the power consumption of cellphone and other mobile terminal 100.

Optionally, VR screen unit 4 comprises at least one VR screen. For instance, VR screen unit 4 may comprise two VR screens, as FIG. 4 shows.

Optionally, mobile terminal 100 further comprises a video signal interface configured to establish communication links with VR head-mounted device 200; video signal interface has communication links with main screen unit 3; processing unit 1 is configured to transmit the video signals to VR head-mounted device 200 via the video signal interface so that VR head-mounted device 200 can play the video signals.

Specifically, the video signal interface configured to establish communication links with VR head-mounted device 200 can realize the communication links between mobile terminal 100 and VR head-mounted device 200 and enable processing unit 1 to export video signals to VR head-mounted device 200 via video signal interface so that VR head-mounted device 200 can play the video signals.

In this way, the field angle of the system can be effectively increased and the problems of dizziness and incomplete immersion of VR experience can be overcome through playing of video signals via mobile terminal 100 and VR head-mounted device 200.

The video signal interface may be HDMI/DP and other standard video data interfaces.

Optionally, mobile terminal 100 further comprises video processing unit 2;

Processing unit 1, VR screen unit 4 and video signal interface all have communication links with video processing unit 2;

Video processing unit 2 is configured to compress the video signals and generate compressed video data, transmit the compressed video data to VR screen unit 4 and VR head-mounted device 200 separately so that VR screen unit 4 and VR head-mounted device 200 can analyze the compressed video data and acquire the video signals.

Specifically, the transmission load of video data and the hardware costs can be reduced through compression of video signals via video processing unit 2 and transmission of the compressed video data to VR screen unit 4 and VR head-mounted device 200, wherein VR screen unit 4 is capable of decompressing video data and transmitting the decompressed video signals or the received original video signals to the screen for display.

Optionally, VR head-mounted device 200 comprises VR sub-screen 5; VR sub-screen 5 has communication links with the video signal interface; VR sub-screen 5 is configured to play the video signals.

Specifically, VR head-mounted device 200 plays the video signals via VR sub-screen 5.

Optionally, as FIG. 7 shows, VR head-mounted device 200 further comprises first optical lens 71 and second optical lens 72; first optical lens 71 is positioned between VR screen unit 4 and the user operation side 202 of VR head-mounted device 200; second optical lens 72 is positioned between VR sub-screen 5 and the user operation side 202 of VR head-mounted device 200; and the angle between first optical lens 71 and second optical lens 72 is an obtuse angle.

Specifically, the angle between first optical lens 71 and second optical lens 72 is an obtuse angle to increase the field angle of VR screen unit 4. Such a big field angle can simulate a real scene more accurately and thus effectively address the problems of dizziness and screen door effects in the VR experience of mobile terminal 100 and enhance user experiences.

Optionally, the angle between first optical lens 71 and second optical lens 72 is 130-160 degrees.

Optionally, the angle between first optical lens 71 and VR screen unit 4 is 0-5 degrees. Optionally, the angle between second optical lens 72 and VR sub-screen 5 is 0-5 degrees.

Optionally, VR head-mounted device 200 has a slot to accommodate mobile terminal 100. In this way, mobile terminal 100 and VR head-mounted device 200 can be connected in an irremovable manner.

Specifically, a slot is designed in the casing of VR head-mounted device 200. Mobile terminal 100 is inserted into the slot and the spring-loaded pin in the casing will stop mobile terminal 100 so that mobile terminal 100 is locked in the slot. Then remove the spring-loaded pin to remove mobile terminal 100 from the slot.

The foregoing descriptions are simply preferred embodiments of this application and shall not restrict this application. Those with ordinary skills in the art can make various modifications to and changes of this application. However, all such modifications, equivalent substitutions and improvements shall be within the scope of protection of this application if they conform to the spirits and principles of this application.

INDUSTRIAL UTILITY

The mobile terminal-based VR display system disclosed by this application comprises a mobile terminal and a VR head-mounted device. Said mobile terminal is positioned in the slot at the front end of said VR head-mounted device; said mobile terminal comprises processing unit, video processing unit, main screen unit and VR screen unit, wherein said processing unit is configured to control said main screen unit to export video signals and/or utilize said video processing unit to compress the VR content and export it to said VR screen unit; said VR head-mounted device is configured to receive the content exported by said VR screen unit. This invention uses the interactions between the VR screen unit and the VR head-mounted device mounted on the mobile terminal to enhance the VR display resolution and the field angle and thus apply VR technologies to the mobile terminal.

The invention claimed is:

1. A mobile terminal-based virtual reality display system which is characterized in that it comprises a mobile terminal and a virtual reality head-mounted device; the mobile terminal is positioned in a slot at a front end of the virtual reality head-mounted device;

the mobile terminal comprises a processing unit, a video processing unit, a main screen and a virtual reality screen wherein the processing unit is configured to control the main screen to export video signals and/or utilize the video processing unit to compress the virtual reality content and export it to the virtual reality screen;

the virtual reality head-mounted device is configured to receive a content exported by the virtual reality screen; the main screen is the screen for routine use, the virtual reality screen is normally not on and will be turned on only when VR experience is underway;

the virtual reality head-mounted device is a virtual reality box containing a virtual reality sub-screen inside;

a video signal interface is connected to the video processing unit of the mobile terminal at one end and to the virtual reality head-mounted device at the other end;

the virtual reality sub-screen of the virtual reality head-mounted device and the virtual reality screen of the mobile terminal constitute a twin-screen display mode together; the virtual reality box connects the virtual reality sub-screen into the mobile terminal via HDMI or DP interface to constitute the twin-screen display mode; the virtual reality screen of the mobile terminal has a higher resolution and thus can realize the virtual reality support of mobile terminal, wherein resolution of the virtual reality screen of the mobile terminal is higher than resolution of the main screen of the mobile terminal.

2. The mobile terminal-based virtual reality display system of claim 1, wherein the main screen and the virtual reality screen are positioned on the front and rear sides of the mobile terminal respectively.

3. The mobile terminal-based virtual reality display system of claim 2, wherein the virtual reality screen comprises two virtual reality screens.

4. The mobile terminal-based virtual reality display system of claim 1, wherein the virtual reality box comprises a first optical lens and a second optical lens inside and an angle between the first optical lens and the second optical lens is an acute angle.

5. The mobile terminal-based virtual reality display system of claim 4, wherein the angle between the first optical lens and the second optical lens is 15 degrees.

6. The mobile terminal-based virtual reality display system of claim 5, wherein an angle between the first optical lens and the virtual reality screen of the mobile terminal is 0-5 degrees.

7. The mobile terminal-based virtual reality display system of claim 6, wherein an angle between the second optical lens and the virtual reality sub-screen is 0-5 degrees.

8. The mobile terminal-based virtual reality display system of claim 2, wherein the mobile terminal has a video signal interface on it.

9. The mobile terminal-based virtual reality display system of claim 1, wherein the field angle can exceed 200 degrees when the virtual reality screen and virtual reality sub-screen work together.

10. A mobile terminal-based virtual reality display system, the system comprising a mobile terminal and a virtual reality head-mounted device;

the mobile terminal is connected onto the virtual reality head-mounted device in a removable manner and it comprises one processing unit, a main screen and a virtual reality screen; relative to the main screen, the virtual reality screen is close to an user operation side of the virtual reality head-mounted device; both the main screen and the virtual reality screen have communication links with the processing unit; the processing unit is configured to control the main screen unit to export video signals to the virtual reality screen so that the virtual reality screen can play the video signals; the main screen is the screen for routine use, the virtual reality screen is normally not on and will be turned on only when VR experience is underway;

the mobile terminal further comprises a video signal interface for communication with the virtual reality head-mounted device; the video signal interface has communication links with the main screen; the processing unit is configured to export the video signals to the virtual reality head-mounted device via the video signal interface so that the virtual reality head-mounted device can play the video signals;

the mobile terminal further comprises a video processing unit;

the processing unit, virtual reality screen and video signal interface all have communication links with the video processing unit;

the video processing unit is configured to compress the video signals to create compressed video data and transmit the compressed video data to the virtual reality screen and the virtual reality sub-screen of the virtual reality head-mounted device so that the virtual reality screen and the virtual reality sub-screen of the virtual reality head-mounted device can analyze the compressed video data and acquire video signals;

the virtual reality head-mounted device comprises a virtual reality sub-screen; the virtual reality sub-screen has communication links with the video signal interface; the virtual reality sub-screen is configured to play the video signals;

the virtual reality sub-screen of the virtual reality head-mounted device and the virtual reality screen of the mobile terminal constitute a twin-screen display mode together; the virtual reality head-mounted device connects the virtual reality sub-screen into the mobile terminal via HDMI or DP interface to constitute the twin-screen display mode; the virtual reality screen of the mobile terminal has a higher resolution and thus can realize the virtual reality support of mobile terminal, wherein resolution of the virtual reality screen of the mobile terminal is higher than resolution of the main screen of the mobile terminal.

11. The mobile terminal-based virtual reality display system of claim 10, wherein the virtual reality head-mounted device further comprises a first optical lens and a second optical lens; the first optical lens is positioned between the virtual reality screen and the user operation side of the virtual reality head-mounted device; the second optical lens is positioned between the virtual reality sub-screen and the user operation side of the virtual reality head-mounted device; and the first optical lens and second optical lens constitute an obtuse angle.

12. The mobile terminal-based virtual reality display system of claim 11, wherein an angle between the first optical lens and the second optical lens is 130-160 degrees.

13. The mobile terminal-based virtual reality display system of claim 11, wherein an angle between the first optical lens and the virtual reality screen is 0-5 degrees.

14. The mobile terminal-based virtual reality display system of claim 11, wherein an angle between the second optical lens and the virtual reality sub-screen is 0-5 degrees.

15. The mobile terminal-based virtual reality display system of claim 10, wherein the virtual reality screen unit comprises at least one virtual reality screen.

16. The mobile terminal-based virtual reality display system of claim 10, wherein the virtual reality head-mounted device has a slot to accommodate the mobile terminal.

* * * * *